United States Patent
Diener et al.

(10) Patent No.: US 8,577,699 B1
(45) Date of Patent: Nov. 5, 2013

(54) QUOTING INSURANCE PREMIUMS

(75) Inventors: Raymond Robert Diener, San Antonio, TX (US); Sunita Shah, San Antonio, TX (US); Richard Lee Wright, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 883 days.

(21) Appl. No.: 11/849,317

(22) Filed: Sep. 3, 2007

(51) Int. Cl.
  *G06Q 40/00* (2012.01)

(52) U.S. Cl.
  USPC ....... 705/4; 705/2; 705/35; 705/38; 705/26.1; 705/1.1

(58) Field of Classification Search
  USPC .......... 705/1, 4, 1.1, 2, 35, 38, 26.1; 434/236; 707/101, 10, 4
  See application file for complete search history.

(56) References Cited

U.S. PATENT DOCUMENTS

| | | | | |
|---|---|---|---|---|
| 4,831,526 | A * | 5/1989 | Luchs et al. | 705/4 |
| 5,655,085 | A * | 8/1997 | Ryan et al. | 705/4 |
| 7,343,309 | B2 * | 3/2008 | Ogawa et al. | 705/4 |
| 2002/0026334 | A1 * | 2/2002 | Igoe | 705/4 |

OTHER PUBLICATIONS

"Keynote: Auto Insurance Web Sites Main Consumer Source for Quotes." Insurance Journal, May 24, 2005 [retrieved from the Internet on Jan. 17, 2008 using <URL: http://www.insurancejournal.com/news/national/2005/05/24/55399.htm?print=1>.

Sarti, E. "Revolution or Evolution' The Internet Goes Mainstream." Insurance Journal, Mar. 11, 2002 [retrieved from the Internet on Jan. 17, 2008 using <URL: http://www.insurancejournal.com/magazines/west/2002/03/11/features/18839. htm?print=1>.

Tapia, C. "Homeowner Policy Sales Make a Successful Online Debut." Insurance Journal, Jun. 12, 2000 [retrieved from the Internet on Jan. 17, 2008 using <URL: http://www.insurancejournal.com/magazines/west/2000/06/12/ features/22588.htm?print=1>.

Upfield, S. "You Bet There's More to a Comparative Rater Than Just Quoting." Insurance Journal, Feb. 24, 2003 [retrieved from the Internet on Jan. 17, 2008 using <URL: http://www.insurancejournal.com/magazines/southcentral/2003/02/24/features/26649.htm>.

* cited by examiner

*Primary Examiner* — John H Holly

(74) *Attorney, Agent, or Firm* — Kilpatrick Townsend & Stockton LLP

(57) ABSTRACT

Methods and systems are disclosed for providing quotes on multiple types of insurance policies concurrently. The quotes are individually personalized rather than a class or group quote. The methods and systems significantly reduce the number of insurability questions required to obtain a quote. This reduced set of questions may be used to generate quotes on multiple policies concurrently for a given type of insurance. The methods and systems, however, are applicable to multiple types of insurance. Similarly, the quotes may be "directionally correct" quotes, or they may be provided as a range of possible premiums. Quotes for family members may also be obtained at the same time on similar insurance policies. Personal information may be automatically prefilled to the extent such information is available. Other aspects include the ability to apply for the quoted insurance policies directly from the quotes and to save the quotes for subsequent retrieval.

21 Claims, 9 Drawing Sheets

| | | |
|---|---|---|
| 502 ⌇ Effective date: | June 14, 2007 | |
| Get quote for: | ○ User name | |
| 504 ⌇ | ○ Spouse name | |
| | ◉ Both | |
| 506 ⌇ Products to quote: | ○ Term Life | |
| | ○ Whole Life | |
| | ◉ Both | |

| | | User name | Spouse name |
|---|---|---|---|
| 508 ⌇ | Health question 1? | ○ Yes  ◉ No | ○ Yes  ◉ No |
| 510 ⌇ | Health question 2? | ○ Yes  ◉ No | ○ Yes  ◉ No |
| 512 ⌇ | Height: | 6.0 feet ▼ | 5.6 feet ▼ |
| 514 ⌇ | Weight: | 165 \| lbs | 115 \| lbs |

[Cancel]  [Get Quote]  [View Quotes]
 516          518           520

FIG. 5

| | | User name | Spouse name |
|---|---|---|---|
| Term Life | Whole Life | | |
| 604 — Term period: | | 30 years ▼ | 30 years ▼ |
| 606 — Coverage level: | | $250,000 ▼ | $250,000 ▼ |
| 608 — Include child protection plan? | | ◉ Yes  ○ No | ◉ Yes  ○ No |
| 610 — Child protection plan amount: | | $ 25,000 | |
| 612 — Include waiver of premium if disabled? | | ◉ Yes  ○ No | ◉ Yes  ○ No |
| 614 — Payment method: | | Auto payment ▼ | Auto payment ▼ |
| 616 — Payment frequency: | | Monthly ▼ | Monthly ▼ |

Cancel (618)   Get Quote (620)

FIG. 6A

| | | User name | Spouse name |
|---|---|---|---|
| Term Life | Whole Life | | |
| 604 — Payment duration: | | Life ▼ | Life ▼ |
| 606 — Coverage level: | | $50,000 ▼ | $50,000 ▼ |
| 608 — Include child protection plan? | | ◉ Yes  ○ No | ◉ Yes  ○ No |
| 610 — Child protection plan amount: | | $ 25,000 | |
| 612 — Include waiver of premium if disabled? | | ◉ Yes  ○ No | ◉ Yes  ○ No |
| 614 — Payment method: | | Auto payment ▼ | Auto payment ▼ |
| 616 — Payment frequency: | | Monthly ▼ | Monthly ▼ |

Cancel (618)   Get Quote (620)

FIG. 6B

| | | | 700 |
|---|---|---|---|
| User name | Spouse name | | |
| Effective June 14, 2007 | | Term Life | Whole Life |
| Total monthly premium: | | $36.30 | $44.06 |
| Coverage level (cost): | | $250,000 ($26.45) | $50,000 ($42.11) |
| Term period / Payment duration: | | 30 years | Life |
| Child protection plan (cost): | | $25,000 ($6.24) | |
| Waiver of premium for disability cost: | | $3.61 | $1.95 |
| Life event option: | | | ◉ Yes   ○ No |
| Suggested coverage update: | | $500,000 ($49.54) | $100,000 ($74.68) |

702 — User name tab
704 — Effective date row
706 — Total monthly premium
708 — Coverage level
710 — Term period / Payment duration
712 — Child protection plan
714 — Waiver of premium for disability cost
716 — Life event option
718 — Suggested coverage update

[ Cancel ]   [ Apply ]   [ Save Quotes ]   [ Edit Coverage ]
   720       722       724       726

FIG. 7A

| | | | 700 |
|---|---|---|---|
| User name | Spouse name | | |
| Effective June 14, 2007 | | Term Life | Whole Life |
| Total monthly premium: | | $37.28 | $50.31 |
| Coverage level (cost): | | $250,000 ($32.49) | $50,000 ($48.32) |
| Term period / Payment duration: | | 30 years | Life |
| Waiver of premium for disability cost: | | $4.79 | $1.99 |
| Life event option: | | | ◉ Yes   ○ No |
| Suggested coverage update: | | $500,000 ($54.49) | $100,000 ($145.11) |

702 — Spouse name tab
704, 706, 708, 710, 714, 716, 718 labels as above

[ Cancel ]   [ Apply ]   [ Save Quotes ]   [ Edit Coverage ]
   720       722       724       726

FIG. 7B

| 802 | | | | | | | 800 |
|---|---|---|---|---|---|---|---|
| | User name | Spouse name | | | | | |
| | Type | Date | Saved by | Expires | Period/Duration | Coverage | Premium |
| 804 ○ | Term Life | 6/14/07 | User | 7/14/07 | 30 years | $250,000 | $36.30 |
| 806 ● | Whole Life | 6/14/07 | User | 7/14/07 | Life | $50,000 | $44.06 |

Cancel 808  Retrieve 810

FIG. 8A

| 802 | | | | | | | 808 |
|---|---|---|---|---|---|---|---|
| | User name | Spouse name | | | | | |
| | Type | Date | Saved by | Expires | Period/Duration | Coverage | Premium |
| 804 ● | Term Life | 6/14/07 | User | 7/14/07 | 30 years | $250,000 | $37.28 |
| 806 ○ | Whole Life | 6/14/07 | User | 7/14/07 | Life | $50,000 | $51.30 |

Cancel 808  Retrieve 810

FIG. 8B

QUOTING INSURANCE PREMIUMS

CROSS-REFERENCE TO RELATED APPLICATIONS

This application is related in subject matter to, and incorporates herein by reference in its entirety, each of the following: U.S. patent application Ser. No. 11/849,321 entitled "Quoting Insurance Premiums," filed on Sep. 3, 2007; and U.S. patent application Ser. No. 11/849,322 entitled "Quoting Insurance Premiums," filed on Sep. 3, 2007.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

TECHNICAL FIELD

The disclosed embodiments relate generally to quotations of insurance premiums and, more specifically, to systems and methods for providing concurrently insurance premium quotations for multiple types of insurance policies.

BACKGROUND

There are many types of insurance available, including automobile insurance, property insurance, life insurance, disability insurance, and the like. For each type of insurance, insurance companies often offer multiple types of policies that provide varying degrees of coverage. With life insurance, for example, a consumer may purchase a "term life" policy, a "whole life" policy, or a "Universal life" policy. The main difference between the two is the term life policy only lasts a fixed number of years (e.g., 10 years, 20 years, 30 years, etc.), whereas the whole life and Universal life policy can last the lifetime of the consumer.

When purchasing an insurance policy, it is customary to first obtain an estimate of the policy's premium, commonly called a quotation or "quote" for short. In the past, consumers obtained such quotes by contacting the insurance companies or their agents, specifying the type of insurance sought, providing their personal information, and answering a series of insurability questions. For life insurance policies, such insurability questions may include whether the consumer had ever been hospitalized, participated in high-risk activities, and so on. Automobile insurance quotes may require the person answer questions about their driving record, and so on. The insurance companies processed this information and thereafter provided the consumers with a quote for the desired insurance policy. This allowed the consumers to compare quotes from several insurance companies before choosing a particular policy. Unfortunately, the insurability questions asked tended to be numerous, detailed, and often redundant, requiring the consumer to complete multiple pages of questions in many cases.

With the advent of the Internet, the above quote process became immeasurably more convenient. So long as he/she had a computer and Internet access, almost any consumer could obtain a quote for virtually any insurance policy at essentially any time. One simply needed to go to the URL (uniform resource locator) of one of numerous insurance company Web sites, enter the requested information, and the Web site returned a quote almost instantaneously. But while more convenient, the Internet-based quote process was not any less tedious in terms of the number of insurability questions the consumer had to answer. That is, most insurance company Web sites still required the consumer to complete several pages of questions in order to generate the quotes.

In addition, most insurance company Web sites only allow the consumer to obtain a quote for one type of insurance policy at a time. For example, if the consumer wished to obtain a quote for both a term life insurance policy and a whole life insurance policy, he/she needed to go through the quote process separately and sequentially for each policy. Moreover, existing insurance company Web sites only allow the consumer to obtain a quote for one person at a time. Thus, if the consumer wished to obtain a quote for his/her spouse and/or children, he/she needed to go through the quote process separately for each person. Compounding the problem, the consumer typically must manually enter the required information into the Web sites, which can be tedious and time-consuming.

Accordingly, what is needed is a more efficient way to provide consumers with quotes for insurance policies. More specifically, what is needed is a way to allow the consumers to obtain quotes for multiple types of insurance policies and/or for multiple people concurrently.

SUMMARY

The disclosed embodiments are directed to Web-based methods and systems for providing quotes on multiple types of insurance policies and/or for multiple people concurrently. The quotes are personalized based on the person requesting the quotes rather than standard quotes for a general class or group of people. In one implementation, the disclosed embodiments significantly reduce the number of insurability questions the person must answer to obtain a quote. This reduced set of questions may then be used to generate quotes for multiple types of insurance policies concurrently for a given type of insurance. The methods and systems, however, are applicable to multiple types of insurance. The quotes may be "directionally correct" quotes, or they may be a range of possible premiums from which the actual premium will be subsequently established. The person may also obtain quotes at the same time for the person's family members on similar insurance policies. Personal information for the person may be automatically prefilled to the extent such information is available. Other aspects of the disclosed embodiments include the ability to apply for the quoted insurance policies directly from the quotes and to save the various quotes for subsequent retrieval.

BRIEF DESCRIPTION OF THE DRAWINGS

The foregoing and other advantages of the invention will become apparent from the following detailed description and upon reference to the drawings, wherein:

FIG. 5 shows an exemplary user information screen for providing insurance quotes on multiple types of insurance policies according to the disclosed embodiments;

FIGS. 6A-6B show an exemplary coverage screen for providing insurance quotes on multiple types of insurance policies according to the disclosed embodiments;

FIGS. 7A-7B show an exemplary quotes screen for providing insurance quotes on multiple types of insurance policies according to the disclosed embodiments;

FIGS. 8A-8B show an exemplary saved quotes screen for quotes on multiple types of insurance policies according to the disclosed embodiments.

DETAILED DESCRIPTION

Figure 1:
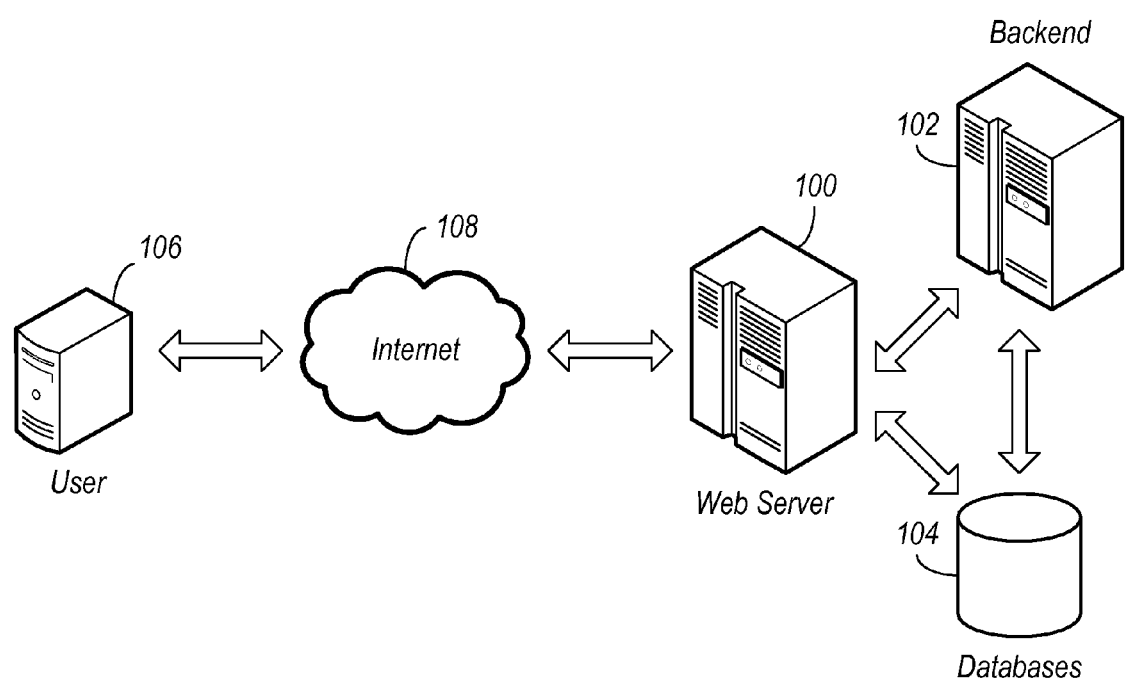
FIG. 1 shows an exemplary infrastructure for providing insurance quotes on multiple types of insurance policies according to the disclosed embodiments.

The drawings described above and the written description of specific structures and functions below are not presented to limit the scope of what has been invented or the scope of the appended claims. Rather, the drawings and written description are provided to teach any person skilled in the art to make and use the inventions for which patent protection is sought. Those skilled in the art will appreciate that not all features of a commercial embodiment of the inventions are described or shown for the sake of clarity and understanding.

Persons of skill in this art will also appreciate that the development of an actual commercial embodiment incorporating aspects of the inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure.

It should be understood that the embodiments disclosed and taught herein are susceptible to numerous and various modifications and alternative forms. Thus, the use of a singular term, such as, but not limited to, "a" and the like, is not intended as limiting of the number of items. Also, the use of relational terms, such as, but not limited to, "top," "bottom," "left," "right," "upper," "lower," "down," "up," "side," and the like, are used in the written description for clarity in specific reference to the drawings and are not intended to limit the scope of the invention or the appended claims.

Particular embodiments are now described with reference to block diagrams and/or operational illustrations of methods. It should be understood that each block of the block diagrams and/or operational illustrations, and combinations of blocks in the block diagrams and/or operational illustrations, may be implemented by analog and/or digital hardware, and/or computer program instructions. Computer programs instructions for use with or by the embodiments disclosed herein may be written in an object oriented programming language, conventional procedural programming language, or lower-level code, such as assembly language and/or microcode. The program may be executed entirely on a single processor and/or across multiple processors, as a stand-alone software package or as part of another software package. Such computer program instructions may be provided to a processor of a general-purpose computer, special-purpose computer, ASIC, and/or other programmable data processing system.

The executed instructions may also create structures and functions for implementing the actions specified in the mentioned block diagrams and/or operational illustrations. In some alternate implementations, the functions/actions/structures noted in the drawings may occur out of the order noted in the block diagrams and/or operational illustrations. For example, two operations shown as occurring in succession, in fact, may be executed substantially concurrently or the operations may be executed in the reverse order, depending on the functionality/acts/structure involved.

Referring now to FIG. 1, an exemplary infrastructure is shown for providing insurance quotes on multiple types of insurance policies and/or for multiple people concurrently according to the disclosed embodiments. For economy of the description, these embodiments are discussed only with respect to one type of insurance, namely, life insurance. However, those having ordinary skill in the art will understand that the disclosed embodiments are equally applicable to other types of insurance, including automobile insurance (e.g., bodily injury and property damage, personal injury protection, uninsured and underinsured motorists, collision, and comprehensive, etc.), property insurance (e.g., homeowners, fire, renters, flood, umbrella, etc.), and the like. In addition, although only term life and whole life policies are discussed herein, those having ordinary skill in the art will understand that Universal life and other types of life insurance policies are also contemplated by the disclosed embodiments.

As can be seen in FIG. 1, the exemplary infrastructure includes at least one Web server 100, a backend 102, and one or more databases 104, all interconnected as shown. The Web server 100 supports a Web site, such as an insurance company Web site. A user 106 using a computer running a Web browser may then connect to the Web server 100 through the Internet 108 to obtain insurance quotes. Upon request, information from the user 106 is gathered by the Web server 100 and passed to the backend 102. The backend 102 thereafter uses the information to generate insurance quotes and passes them back to the Web server 100 for presentation to the user 106. The scheme or algorithm used by the backend 102 to generate insurance quotes may be any scheme or algorithm known to those having ordinary skill in the art and is therefore not described in detail here. For the present life insurance embodiments, it is sufficient to note that any suitable actuarial scheme or algorithm capable of generating term life or whole life insurance policy quotes may be used by the backend 102. As for the databases 104, these provide storage for any data and/or information that may be needed by the backend 102 and the Web server 100.

In operation, when the user 106 accesses the Web server 100, he/she may be presented with an offer to purchase insurance. To this end, the user 106 may be given the option of obtaining quotes for a term life insurance policy, a whole life insurance policy, or both. In addition, the user 106 may be given the option of obtaining the quotes for himself/herself, a spouse, children, and/or all of the above. Upon accepting the offer, the user 106 may be asked to provide his/her personal information, such as a name, address, date of birth, and so forth. If the user 106 has an existing account with the insurance company, or if the information has otherwise been previously collected, then some or all of this information may be prefilled by the Web server 100 from the databases 104 using the user's logon ID.

The user 106 may then be asked a series of insurability questions related to life insurance. In accordance with the disclosed embodiments, the number of insurability questions are substantially reduced relative to that commonly used in the industry. In addition, the same or a similar set of reduced questions may be employed for both the term life and the whole life insurance policy quotes. Using the personal information and the reduced insurability questions, the backend 102 generates "directionally correct" quotes, or a range of possible premiums for the user 106, spouse, and/or children. As understood by those having ordinary skill in the art, directionally correct quotes are quotes that are correct 60% of the time; that is, they are likely to be modified 40% of the time. Where a range is quoted, it may be necessary to explain to the user 106 that the actual premium may lie somewhere between an upper and a lower limit of that range. The Web server 100 thereafter presents the generated quotes to the user 106 for both policies concurrently. The user 106 may then apply for any of the quoted policies directly, including the one for his/her spouse, or save one or more of the quotes for subsequent retrieval. It should be noted that, where applicable, the spouse may need to apply for his/her own insurance policy separately.

Figure 2:
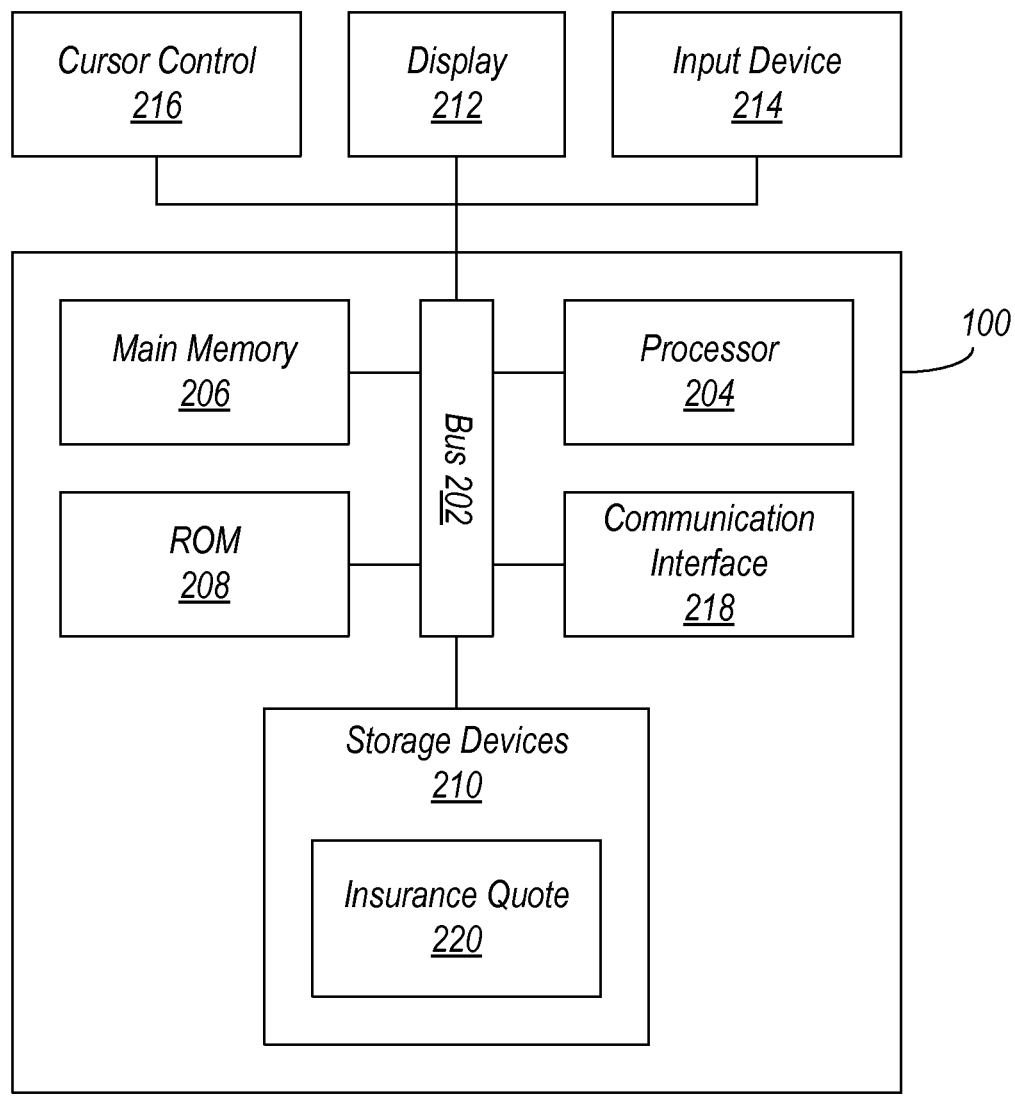
FIG. 2 shows an exemplary system capable of providing insurance quotes on multiple types of insurance policies according to the disclosed embodiments.

FIG. 2 illustrates the web server 100 in more detail according to the disclosed embodiments. Any suitable computer known to those having ordinary skill in the art may be used as the web server 100, including a personal computer, workstation, server, mainframe, and the like. Such a web server 100 typically includes a bus 202 or other communication mechanism for communicating information and a processor 204 coupled with the bus 202 for processing information. The web server 100 may also include a main memory 206, such as a random access memory (RAM) or other dynamic storage device, coupled to the bus 202 for storing computer-readable instructions to be executed by the processor 204. The main memory 206 may also be used for storing temporary variables or other intermediate information during execution of the instructions to be executed by the processor 204. The web server 100 may further include a read-only memory (ROM) 208 or other static storage device coupled to the bus 202 for storing static information and instructions for the processor 204. A computer-readable storage device 210, such as a magnetic, optical, or solid state device, may be coupled to the bus 202 for storing information and instructions for the processor 204.

The web server 100 may be coupled via the bus 202 to a display 212, such as a cathode ray tube (CRT) or liquid crystal display (LCD), for displaying information to a user. An input device 214, including, for example, alphanumeric and other keys, may be coupled to the bus 202 for communicating information and command selections to the processor 204. Another type of user input device may be a cursor control 216, such as a mouse, a trackball, or cursor direction keys for communicating direction information and command selections to the processor 204, and for controlling cursor movement on the display 212. The cursor control 216 typically has two degrees of freedom in two axes, a first axis (e.g., X axis) and a second axis (e.g., Y axis), that allow the device to specify positions in a plane.

The term "computer-readable instructions" as used above refers to any instructions that may be performed by the processor 204 and/or other components. Similarly, the term "computer-readable medium" refers to any storage medium that may be used to store the computer-readable instructions. Such a medium may take many forms, including, but not limited to, non volatile media, volatile media, and transmission media. Non volatile media may include, for example, optical or magnetic disks, such as the storage device 210. Volatile media may include dynamic memory, such as main memory 206. Transmission media may include coaxial cables, copper wire and fiber optics, including wires of the bus 202. Transmission media may also take the form of acoustic or light waves, such as those generated during radio frequency (RF) and infrared (IR) data communications. Common forms of computer-readable media may include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer-readable media may be involved in carrying one or more sequences of one or more instructions to the processor 204 for execution. For example, the instructions may initially be borne on a magnetic disk of a remote computer. The remote computer can load the instructions into its dynamic memory and send the instructions over a telephone line using a modem. A modem local to the web server 100 can receive the data on the telephone line and use an infrared transmitter to convert the data to an infrared signal. An infrared detector coupled to the bus 202 can receive the data carried in the infrared signal and place the data on the bus 202. The bus 202 carries the data to the main memory 206, from which the processor 204 retrieves and executes the instructions. The instructions received by the main memory 206 may optionally be stored on the storage device 210 either before or after execution by the processor 204.

The web server 100 may also include a communication interface 218 coupled to the bus 202. The communication interface 218 typically provides a two way data communication coupling between the web server 100 and the network 106. For example, the communication interface 218 may be an integrated services digital network (ISDN) card or a modem used to provide a data communication connection to a corresponding type of telephone line. As another example, the communication interface 218 may be a local area network (LAN) card used to provide a data communication connection to a compatible LAN. Wireless links may also be implemented. Regardless of the specific implementation, the main function of the communication interface 218 is to send and receive electrical, electromagnetic, optical, or other signals that carry digital data streams representing various types of information.

In accordance with the disclosed embodiments, an insurance quote application 220, and the computer-readable instructions therefor, may reside on the storage device 210. The insurance quote application 220 may then be executed by the web server 100 to provide insurance quotes on multiple types of insurance policies and/or for multiple people concurrently. In one implementation, the insurance quote application 220 interacts with the user 106 to obtain input from the user 106. The insurance quote application 220 thereafter passes the input to the backend 102 for processing. Any output received from the backend 102 is subsequently presented to the user 106 for consideration. Such an insurance quote application 220 may be implemented using any suitable programming language known to those having ordinary skill in the art, include Java, C++, Visual Basic, and the like.

Figure 3:
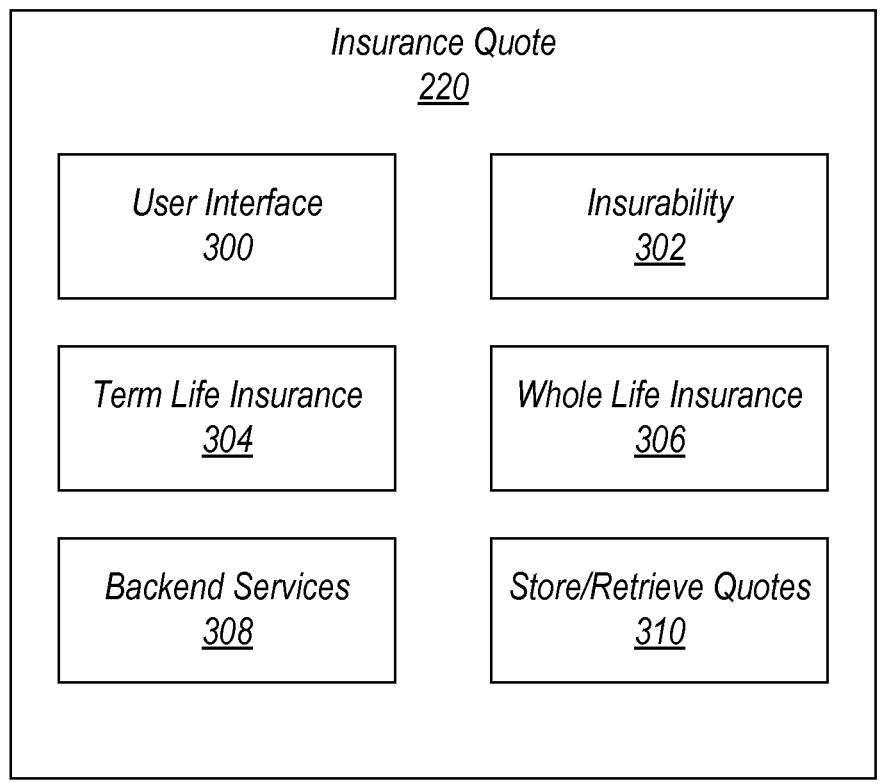
FIG. 3 shows an exemplary application configured to provide insurance quotes on multiple types of insurance policies according to the disclosed embodiments.

Referring to FIG. 3, in one embodiment, the insurance quote application 220 comprises a number of functional components, including a user interface module 300, an insurability module 302, and a term life module 304. Other functional components may include a whole life module 306, a backend services module 308, and a module 310 for storing and retrieving issued quotes. Note that although the various functional components 300-310 of the insurance quote application 220 have been shown as discrete units in FIG. 3, those having ordinary skill in the art will understand that two or more of these components may be combined into a single component, and that any individual component may be divided into several constituent components, without departing from the disclosed embodiments.

In general, the user interface module 300 allows the various functional components of the insurance quote application 220 to interact with the user 106 as needed. To this end, the user interface module 300 may provide an interface, including a graphical user interface, a telephone interface, or other types of interface for receiving input from the user 106. Such input may include, for example, personal information about the user 106, answers to insurability questions, coverage selections, and the like. Of course, in addition to receiving input, the user interface may also be used to present the resulting insurance quotes to the user 106. If the user 106 already has an existing account with the insurance company, or if the information has otherwise been previously collected, then the user interface module 300 may automatically prefill some or all of the user's personal information. Prefilling of personal information may also be performed for the user's spouse if such information is available. A specific example of a graphical user interface is described later herein with respect FIGS. 5, 6A-6B, 7A-7B, and 8A-8B. Those having ordinary skill in the art will understand, however, that numerous layouts and designs of graphical user interface beyond those discussed herein are possible so long as they can perform the functions above.

The insurability module 302 performs an initial or first-pass determination of the insurability of the user 106. To this end, the insurability module 302 may gather, through the user interface of the user interface module 300, information about the insurability of the user 106. In one implementation, the insurability module 302 performs this function by presenting a series of questions to the user 106 relating to the particular type of insurance being sought. In accordance with the disclosed embodiments, the insurability module 302 may present a reduced set of question instead of the extensive list commonly employed in the industry. For life insurance, these questions may be reduced to two or three questions about the user's health, such as whether the user has used tobacco products recently, whether there is a history of a certain illness in the user's family, and the like. Of course, it is certainly possible to ask additional questions as needed. In any event, if the answer to any of these questions is affirmative, indicating that there may be insurability issues, then the insurability module 302 may redirect the user 106 to a Web page where he/she may contact a representative of the insurance company for further information. Otherwise, the process is allowed to continue to coverage selection.

Coverage selection and quotes provision are the responsibility of the term life module 304 and the whole life module 306. In general, the term life module 304 obtains coverage information from the user 106 for a term life policy, and the whole life module 306 obtains coverage information from the user 106 for a whole life policy. Through the user interface, these modules 304 and 306 may ask the user 106 to select, for example, the amount of death benefit, how long payments are to be made, the frequency of payments, the method of payments, and other similar information. The modules 304 and 306 may request this information for either the user 106 and/or the user's spouse and/or children. In the case of children, the modules 304 and 306 may offer coverage in the form of a rider that takes on many of the terms of the user's coverage. Other riders may also be offered, such as waiver of premiums for disability, dismemberment, and the like, without departing from the scope of the disclosed embodiments. In some cases, the user 106 may be offered an option to upgrade his/her coverage and his/her spouse's coverage upon occurrence of a certain event, such as the birth of a child, purchase of a new home, and the like. The term life module 304 and the whole life module 306 thereafter pass the above information to the backend 102 to be used to generate term life and whole life policy quotes, respectfully. The quotes are then returned to the modules 304 and 306 for presentation to the user 106. Note that while the disclosed embodiments can provide quotes for both term life and whole life policies concurrently, it is certainly possible to proceed with only one or the other without departing from the scope of the disclosed embodiments.

The backend services module 308 interfaces the insurance quote application 220 to the backend 102, providing information from/to the various functional components of the insurance quote application 220 to/from the backend 102. Recall that the backend 102 serves to generate a directionally correct quote, or a range of possible premiums, based on the user's personal information and coverage selections. Thus, one of the functions of the backend services module 308 may be to ensure that this information is passed from the various functional components of the insurance quote application 220 to the backend 102 in a format that it can use. Likewise, the backend services module 308 ensures that quotes and other information resulting from the backend 102 are provided to the insurance quote application 220 in the proper format.

Finally, the store/retrieve quotes module 310 allows the user 106, through the user interface, to store any insurance quotes he/she may have received. It is also possible for the store/retrieve quotes module 310 to store the quotes automatically so that no selection by the user 106 is necessary. Such quotes are typically valid for a predefined period of time set by the insurance company, for example, two weeks, one month, and the like. The store/retrieve quotes module 310 may allow the user 106 to recall the stored quotes at any time prior to expiration of these quotes through the user interface. The user may also store any quotes that were generated for his/her spouse. When that happens, the store/retrieve quotes module 310 may send an e-mail message to the spouse notifying him/her of the quote. In some cases, the e-mail message may contain a direct link that takes the spouse directly to the Web page for the quotes after logging on and satisfying any other security procedures. If an e-mail address for the spouse is not available, the store/retrieve quotes module 310 may request that the user 106 provide the e-mail address at the time the quotes are saved.

Figure 4:
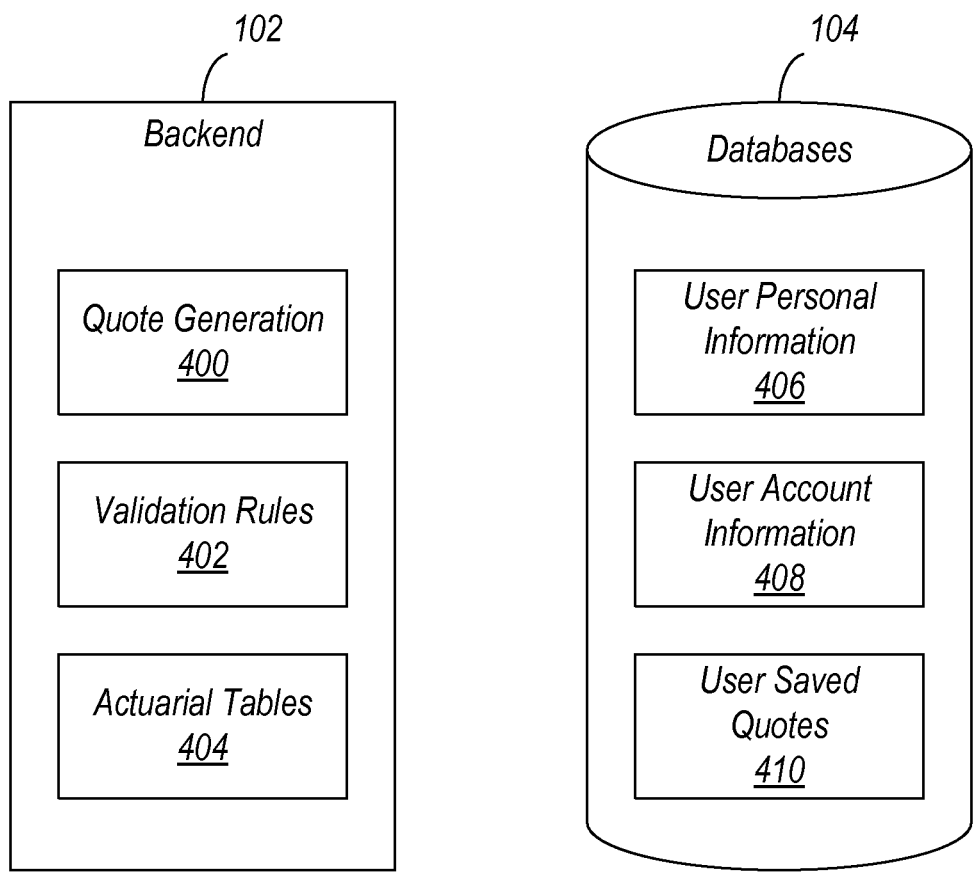
FIG. 4 shows an exemplary database and backend for providing insurance quotes on multiple types of insurance policies according to the disclosed embodiments.

FIG. 4 illustrates the backend 102 and databases 104 of the infrastructure shown in FIG. 1 in more detail. Like the Web server 100, the backend 102 and databases 104 may be implemented using any suitable computers known to those having ordinary skill in the art, including personal computers, workstations, servers, mainframes, and the like. As mentioned briefly above, in general, the backend 102 is configured to generate insurance quotes based on information received from the Web server 100, and to pass the quotes back to the Web server 100 for presentation to the user 106. The databases 104, meanwhile, are configured to provide storage for any data and/or information that may be needed by the backend 102 and the Web server 100.

In some embodiments, the backend 102 includes a number of functional components, including a quote generation component 400 and a validation rules component 402. In keeping with the life insurance embodiments described thus far, the backend 102 may also include actuarial tables 404. It is clear, however, that other data tables may be used for embodiments that involve other types of insurance. And while a number of discrete components are shown, those having ordinary skill in the art will understand that two or more components may be combined into a single component, and in the individual component may be divided into several constituent components, without departing from the scope of the disclosed embodiments.

The quote generation component 400 is primarily responsible for generating the term life and whole life insurance policy quotes based on the user's personal information and coverage selections. Any scheme or algorithm known to those having ordinary skill in the art may be used to generate the insurance quotes. To this end, the quote generation component 400 may access the actuarial tables 404 as needed to generate the quotes. Such actuarial tables 404 (also called "life tables"), like the scheme or algorithm that use them, may include any actuarial tables known to those having ordinary skill in the art. In some embodiments, the quote generation component 400 may perform its function fully automatically without user intervention. In other embodiments, however, manual intervention by an actuary may take place as needed.

The validation rules component 402 is configured to ensure that valid insurance quotes are generated. To this end, the validation rules component 402 may apply a set of rules for checking the validity of each request for insurance quote from the Web server 100. Such rules may include, for example, exclusion of users 106 who are above a certain age, users 106 who request death benefits that are disproportionate to their annual income or net worth amount, users who were previously denied life insurance for some reason, and the like. When one of these validation rules is triggered, the validation rules component 402 may notify the insurance quote application 220 to redirect the user 106 to a Web page where he/she may contact a representative of the insurance company for further information.

As for the databases 104, they provide storage for the data and/or information needed by the backend 102 and the Web server 100. In some embodiments, these databases 104 may include user personal information 406, such as the user's name, address, date of birth, and the like. The user personal information 406 may also include personal information regarding the user's spouse and/or children, where such information is available. If the user 106 has an existing account with the insurance company, the information has otherwise been previously collected, then the databases 104 may also store user account information 408, such as the account number and other particulars about the account. If no account exists, then one may be created and the information therefor thereafter stored in the databases 104.

The user account information 408 may also include information on any additional accounts the user 106 may have with the insurance company. For example, the insurance company may provide other financial products in addition to insurance, such as credit cards, investment, banking, and the like, and the user 106 may have one or more of these financial products. Such an arrangement is particularly advantageous insofar as it offers the user 106 a one-stop solution for all of his/her financial needs.

The databases 104 may also store the user's saved insurance quotes 410 that were generated for the user 106. As mentioned earlier, such insurance quotes are usually valid for a predefined period of time (e.g., two weeks, one month, etc.), as set by the insurance company. Within this time period, the user 106 may retrieve and review the saved quotes 410 at any time via the user interface. Likewise, saved quotes 410 for the user's spouse may also be stored in the databases 104 and subsequently retrieved and reviewed using the user interface.

An example of a graphical user interface of the insurance quote application 220 that may be used according to the embodiments is described in FIGS. 5, 6A-6B, 7A-7B, and 8A-8B with respect to a plurality of exemplary screens. Although these figures show a specific implementation of a graphical user interface, including a specific design, layout, and content, those having ordinary skill in the art will recognize that other implementations with different designs, layouts, and content may certainly be used without departing from the scope of the disclosed embodiments. Moreover, although the graphical user interface is described with respect to the interaction between the user 106 and the insurance quote application 220, the disclosed embodiments equally contemplate an insurance company representative using the graphical user interface to interact with the insurance quote application 220 on the user's behalf.

Referring now to FIG. 5, an exemplary user information screen 500 of the graphical user interface is shown for obtaining information about the user as well as his/her coverage selections. The user information screen 500 may be the first screen displayed after the user 106 has accessed the insurance company Web site on the Web server 100 and has indicated a desire, or has otherwise accepted an offer, to obtain insurance quotes. As can be seen, the exemplary user information screen 500 comprises a plurality of information items or fields, including an effective date field 502, a field 504 for indicating whom the insurance quotes are to be obtained for, and a field 506 for indicating which insurance policies are to be quoted. Note that in the second field 504, some of the personal information for the user 106 and his/her spouse, including their names, have been automatically prefilled. Other personal information, such as their dates of birth and the like, may also be prefilled, but not necessarily visibly displayed 106.

In the example shown here, the user 106 has indicated that he/she would like to obtain an insurance quote on both term life and whole life insurance policies concurrently for both the user 106 as well as his/her spouse. After the user 106 marks the appropriate selections, the user information screen 500 presents the user 106 with a set of insurability questions. In accordance with the embodiments, the set of insurability questions is a set of life insurance related questions that has been significantly reduced relative to the extensive list commonly being used in the industry. The questions are designated as "Health question 1" (508) and "Health question 2" (510) and may include, for example, whether the user 106 or his/her spouse has used tobacco in the last 12 months, whether either of their parents has died before the age of 60 due to cancer or cardiovascular disease, and the like. Of course, as mentioned above, additional health questions may be used as needed for life insurance, or a different set of questions may be used for other types of insurance without departing from the scope of the disclosed embodiments. Finally, a height field 512 and a weight field 514 allows the user 106 to enter the height and weight, respectively, for the user 106 and his/her spouse. A Cancel button 516 and a Get Quote button 518 allow the user 106 to thereafter cancel or proceed with the quote request, respectively. A View Quotes button 520 allows the user 106 and his/her spouse to view previously saved quotes.

Upon proceeding with the quote request, the user 106 is taken to a coverage screen 600, illustrated in FIGS. 6A-6B. The coverage screen 600 allows the user 106 to select the specific coverage he/she would like for himself/herself and his/her spouse. Tabs 602 allow the user to switch between term life coverage (FIG. 6A) and whole life coverage (FIG.

6B). In the exemplary coverage screen 600 shown here, a field 604 allows the user 106 to choose the term period or payment duration for the term life policy and whole life policy, respectively, for each of the proposed insured. A coverage level field 606 allows the user 106 to specify the amount of death benefit of both policies for the proposed insured. Fields 608, 610, and 612 allow the user 106 to obtain an optional child protection rider, the death benefit amount therefor, and a waiver of premium in case of disability rider, respectively.

A payment method field 614 and a payment frequency field 616 allow the user 106 to specify the payment method (e.g., check, credit card, bank draft, etc.) and the payment frequency (e.g., monthly, quarterly, semiannually, etc.), respectively, for the proposed insured. This information is useful because, for example, certain payment methods, such as those where the premiums may be automatically withdrawn may result in somewhat lower premiums than manual payment methods. This is particularly true where the insurance company is the same institution that provides the user's bank account, savings account, investment account, and/or credit card accounts. Likewise, fewer but larger payments may result in somewhat lower premiums than frequent small payments, as there is less collection risk less cost to the bank. Another Cancel button 618 and Get Quote button 620 again allow the user 106 to cancel or proceed with the quote request, respectively.

After clicking the Get Quote button 620, the graphical user interface displays a quotes screen 700, an example of which is shown in FIGS. 7A-7B. The quotes screen 700 displays the directionally correct quotes for the term life policy and the whole life policy that were generated by the backend 102 for the user 106 and his/her spouse. Although not depicted here, it is also possible for the quotes screen 700 to display a range of possible premiums for the term life and/or whole life policies. In accordance with the embodiments, the quotes screen 700 displays the quotes for both the term life policy and the whole life policy concurrently. Such an arrangement offers the user 106 and his/her spouse more flexibility and convenience insofar as they have the ability to choose multiple insurance policies if they like.

In the specific example shown, the quotes screen 700 comprises tabs 702 that allow the user 106 to toggle between his/her quotes (FIG. 7A) and his/her spouse's quotes (FIG. 7B). A field 704 shows the effective date on which the quotes are valid, meaning that the user 106 and/or his/her spouse now have a predefined number of days from the date to apply for the quoted policies. A field 706 shows the total premiums, including the costs for any riders or other options, for both the term life and whole life policies concurrently based on the payment frequency (e.g., monthly) selected by the user 106. A coverage level field 708 shows the coverage level selected by the user 106 and his/her spouse or both policies along with the directionally correct premiums associated with that coverage level.

A term period and payment duration field 710 displays the term period and payment duration, respectively, for the term life policy and the whole life policy. Also present are a child protection rider field 712 that displays the coverage and costs for the child protection option, and a waiver of premium for disability field 714 that displays the cost for such a waiver. A life event option field 716 offers the user 106 and his/her spouse an option to upgrade their whole life coverage upon occurrence of a certain event, such as the birth of a child, purchase of a new home, and the like.

In addition to the requested quotes, the quotes screen 700 may also display a "band break" option 718. This band break option 718 shows the next level of term life and/or whole life coverage the user 106 and his/her spouse may be eligible for and may be generated by the backend 102 in the same manner as the requested quotes. The directionally correct quotes for the band break option are also displayed along with the coverage amounts.

A Cancel button 720 once again allow the user 106 to cancel the quote request. However, the Submit button from the previous screens has been replaced with an Apply button 722 for allowing the user 106 and his/her spouse to immediately apply for the quoted insurance policies. In accordance with the disclosed embodiments, clicking the Apply button 722 immediately takes the user 106 and his/her spouse to another Web page (not shown) where they may fill out a form to apply for the quoted policies. A Save Quotes button 724 allows user 106 and his/her spouse to save the requested quotes, and an Edit Coverage button 726 allows them to edit their coverages. With respect to the edit coverage button 726, it should be noted that a modification to a previously saved quote constitutes a new quote and does not overwrite the previously saved quote.

To view a previously saved quote, the user 106 and his/her spouse may click on the View Quotes button 520 (see FIG. 5), which causes previously saved the quotes to be retrieved from the databases 104 and displayed. This is illustrated in FIGS. 8A-8B via an exemplary saved quotes screen 800. Similar to other screens, the saved quotes screen 800 comprises tabs 802 that allow the user 106 to toggle between his/her saved quotes (FIG. 8A) and his/her spouse's saved quotes (FIG. 8B). The saved quotes screen 800 further comprises summary of the term life policy quote 804 and the whole life policy quote 806 that have been saved for the user 106 and his/her spouse under their respective tabs 802. A Cancel button 808 and Retrieve button 810 allow the user 106 to cancel or retrieve the previously saved quotes, respectively. Clicking the Retrieve button 810 takes the user 106 to a screen similar to the quotes screen 700 where the coverages and terms for the retrieved quote is displayed for the user.

Figure 9:
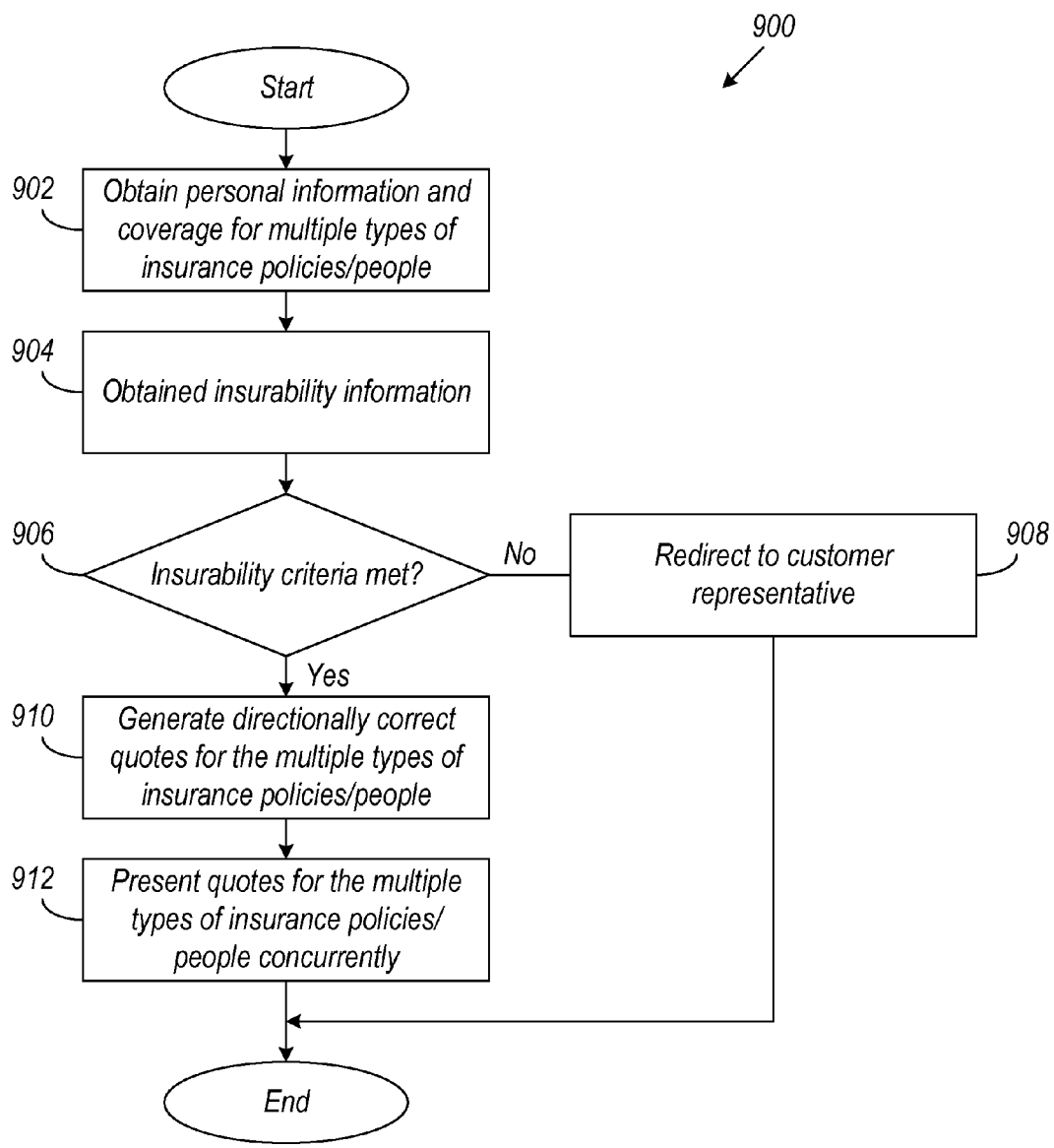
FIG. 9 shows an exemplary method of providing insurance quotes on multiple types of insurance policies according to the disclosed embodiments.

Thus far, specific embodiments have been disclosed for providing quotes on multiple types of insurance policies concurrently. Referring now to FIG. 9, general guidelines are shown in the form of a method 900 that may be used by an insurance company to implement the various embodiments disclosed above. As can be seen, the method 900 begins at block 902, where personal information and coverage selections for multiple types of insurance policies are obtained for the user and his/her spouse. Such information may be obtained for example using a Web form on the insurance company's Web site. Various rider options, if offered, may also be selected at this time. Where the personal information is already available, for example, by virtue of one or more existing accounts with the insurance company, the information may be automatically retrieved from the insurance company's databases and used to prefill the appropriate fields in the Web form. Insurability information for the user and his/her spouse are then obtained at block 904, for example, by presenting a reduced set of insurability questions to the user.

At block 906, an initial or first-pass determination is made as to whether the user and his/her spouse meet the insurance company's insurability criteria. If the answer is no, indicating there may be insurability issues, then at block 908, the user is redirected to contact a representative of the insurance company. If the answer at block 906 is yes, then at block 910, directionally correct quotes are generated for the multiple types of insurance policies. The directionally correct quotes may be generated using any scheme or algorithm known to those having ordinary skill in the art. It is also possible to generate a range of possible premiums rather than a single quote. In any event, the generated quotes for the multiple types of insurance policies may then be presented to the user at block 912 via the insurance company's Web site. At that point, the user has the option to save the quotes for subsequent retrieval, modify the coverage selections and resubmit the quote request, or apply for the quoted policies directly from the quotes Web page.

In some embodiments, the method 900 of FIG. 9 may be performed to provide quotes on only one type of insurance policy, but for multiple people concurrently, without departing from the disclosed embodiments. Likewise, the method 900 FIG. 9 may be performed to provide quotes on multiple types of insurance policies, but only for one person, without departing from the disclosed embodiments.

While the disclosed embodiments have been described with reference to one or more particular implementations, those skilled in the art will recognize that many changes may be made thereto. Therefore, each of the foregoing embodiments and obvious variations thereof is contemplated as falling within the spirit and scope of the disclosed embodiments, which are set forth in the following claims.

What is claimed is:

1. A system for providing a proposed insured with premium quotations on multiple types of policies for a given type of insurance, the system comprising:
   at least one subsystem configured to obtain a request for premium quotation for multiple types of policies for a given type of insurance for a proposed insured;
   at least one subsystem configured to:
      check the validity of the request for premium quotation against a set of rules related to the type of insurance; and
      provide contact information of an insurance company when at least one rule of the set of rules has been triggered;
   at least one subsystem configured to obtain coverage selections for the proposed insured for the multiple types of policies for the given type of insurance;
   at least one subsystem configured to obtain responses from the proposed insured to a set of insurability questions relating to the type of insurance;
   at least one subsystem including a processor configured to generate the requested quotations of premium for each of the multiple types of policies for the given type of insurance, wherein the quotations are based on the coverage selections and the responses of the proposed insured to the set of insurability questions; and
   at least one subsystem configured to present the quotations of premium for each of the multiple types of policies for the given type of insurance concurrently to the proposed insured;
   wherein the policies are insurance policies.

2. The system of claim 1, wherein the given type of insurance comprises one of: life insurance, automobile insurance, and property insurance.

3. The system of claim 1, wherein the multiple types of policies comprise more than one of: a term life insurance policy, a whole life insurance policy, and a Universal life insurance policy.

4. The system of claim 1, further comprising at least one subsystem configured to allow the proposed insured to store one or more quotations of premium and to subsequently retrieve the one or more quotations of premium.

5. The system of claim 1, wherein each one of the quotations of premium comprises one of: a directionally correct premium, and a range of possible actual premiums.

6. The system of claim 1, wherein the obtaining and the presenting are performed by a front-end computer, and the generating is performed by a separate backend computer.

7. The system of claim 6, further comprising at least one subsystem configured to validate each quotation of premium at the backend computer using one or more premium validation rules.

8. A computer-implemented method of providing a proposed insured with premium quotations on multiple types of policies for a given type of insurance, the method comprising:
   obtaining a request for premium quotation for multiple types of policies for a given type of insurance for a proposed insured;
   checking, by a computer, the validity of the request for premium quotation against a set of rules related to the type of insurance;
   providing, by the computer, contact information of an insurance company when at least one rule of the set of rules has been triggered;
   obtaining, by a computer, coverage selections for the proposed insured for the multiple types of policies for the given type of insurance;
   obtaining, by a computer, responses from the proposed insured to a set of insurability questions relating to the type of insurance;
   generating, by a computer, the requested quotations of premium for each of the multiple types of policies for the given type of insurance, wherein the quotations are based on the coverage selections and the responses of the proposed insured to the set of insurability questions; and
   presenting, by a computer, the quotations of premium for each of the multiple types of policies for the given type of insurance concurrently to the proposed insured;
   wherein the policies are insurance policies.

9. The method of claim 8, wherein the given type of insurance comprises one of: life insurance, automobile insurance, and property insurance.

10. The method of claim 8, wherein the multiple types of policies comprise more than one of: a term life insurance policy, a whole life insurance policy, and a Universal life insurance policy.

11. The method of claim 8, further comprising allowing, by a computer, the proposed insured to store one or more quotations of premium and to subsequently retrieve the one or more quotations of premium.

12. The method of claim 8, wherein each one of the quotations of premium comprises one of: a directionally correct premium, and range of possible actual premiums.

13. The method of claim 8, wherein the obtaining and the presenting are performed by a front-end computer, and the generating is performed by a separate backend computer.

14. The method of claim 13, further comprising validating each quotation of premium at the backend computer using one or more premium validation rules.

15. A non-transitory computer-readable medium storing computer-executable instructions for providing a proposed insured with premium quotations on multiple types of policies for a given type of insurance, the instructions comprising instructions for causing a computer to:
   obtain a request for premium quotation for multiple types of policies for a given type of insurance for a proposed insured;
   check the validity of the request for premium quotation against a set of rules related to the type of insurance;
   provide contact information of an insurance company when at least one rule of the set of rules has been triggered;

obtain coverage selections for the proposed insured for the multiple types of policies for the given type of insurance;

obtain responses from the proposed insured to a set of insurability questions relating to the type of insurance;

generate the requested quotations of premium for each of the multiple types of policies for the given type of insurance, wherein the quotations are based on the coverage selections and the responses of the proposed insured to the set of insurability questions; and present the quotations of premium for each of the multiple types of policies for the given type of insurance concurrently to the proposed insured;

wherein the policies are insurance policies.

16. The non-transitory computer-readable medium of claim 15, wherein the given type of insurance comprises one of: life insurance, automobile insurance, and property insurance.

17. The non-transitory computer-readable medium of claim 15, wherein the multiple types of insurance policies comprise more than one of: a term life insurance policy, a whole life insurance policy, and a Universal life insurance policy.

18. The non-transitory computer-readable medium of claim 15, further comprising instructions for causing a computer to allow the proposed insured to store one or more quotations of premium and to subsequently retrieve the one or more quotations of premium.

19. The non-transitory computer-readable medium of claim 15, wherein each one of the quotations of premium comprises one of: a directionally correct premium, and range of possible actual premiums.

20. The non-transitory computer-readable medium of claim 15, wherein the obtaining and the presenting are preformed by a front-end computer, and the generating is performed by a separate backend computer.

21. The non-transitory computer-readable medium of claim 20, further comprising instructions for causing a computer to validate each quotation of premium at the backend computer using one or more premium validation rules.

* * * * *